US012568539B2

(12) United States Patent
Hsu et al.

(10) Patent No.: US 12,568,539 B2
(45) Date of Patent: Mar. 3, 2026

(54) METHOD AND APPARATUS FOR DEALING WITH RESOURCE ALLOCATION AND/OR LINK ADDITION OF ACCESS POINT MULTI-LINK DEVICE

(71) Applicant: MEDIATEK INC., Hsin-Chu (TW)

(72) Inventors: Chien-Fang Hsu, Hsinchu City (TW); James Chih-Shi Yee, San Jose, CA (US)

(73) Assignee: MEDIATEK INC., Hsinchu City (TW)

( * ) Notice: Subject to any disclaimer, the term of this patent is extended or adjusted under 35 U.S.C. 154(b) by 599 days.

(21) Appl. No.: 17/719,385

(22) Filed: Apr. 13, 2022

(65) Prior Publication Data

US 2022/0338287 A1     Oct. 20, 2022

Related U.S. Application Data

(60) Provisional application No. 63/176,386, filed on Apr. 19, 2021.

(51) Int. Cl.
| | |
|---|---|
| *H04W 76/15* | (2018.01) |
| *H04W 24/02* | (2009.01) |
| *H04W 72/04* | (2023.01) |
| *H04W 72/51* | (2023.01) |
| *H04W 88/08* | (2009.01) |

(52) U.S. Cl.
CPC ........... *H04W 76/15* (2018.02); *H04W 24/02* (2013.01); *H04W 72/04* (2013.01); *H04W 72/51* (2023.01); *H04W 88/08* (2013.01)

(58) Field of Classification Search
CPC ..... H04W 76/15; H04W 72/04; H04W 88/08; H04W 8/24; H04W 84/12; H04W 72/51;

H04W 28/18; H04W 24/02; Y02D 30/70; H04L 5/0098
See application file for complete search history.

(56) References Cited

U.S. PATENT DOCUMENTS

| | | | | |
|---|---|---|---|---|
| 11,672,041 | B2 * | 6/2023 | Huang | .................. H04L 1/1614 |
| | | | | 370/329 |
| 11,864,039 | B2 * | 1/2024 | Gan | .................. H04W 36/0077 |
| 11,968,600 | B2 * | 4/2024 | Gan | ......................... H04W 4/06 |
| 12,192,894 | B2 * | 1/2025 | Liu | ........................ H04W 76/25 |
| 2021/0045175 | A1 | 2/2021 | Huang | |
| 2021/0068171 | A1 | 3/2021 | Hsu | |
| 2021/0112543 | A1 | 4/2021 | Das | |
| 2021/0136847 | A1 * | 5/2021 | Nakajima | ............. H04W 12/50 |
| 2022/0069876 | A1 * | 3/2022 | Xue | .................. H04B 7/18504 |
| 2022/0287121 | A1 * | 9/2022 | Hwang | ................. H04W 76/15 |
| 2022/0295336 | A1 * | 9/2022 | Rao | ......................... H04W 4/44 |
| 2023/0007535 | A1 * | 1/2023 | Kim | ....................... H04W 76/15 |

FOREIGN PATENT DOCUMENTS

| | | | | |
|---|---|---|---|---|
| CN | 112449391 | A | 3/2021 | |
| CN | 112492698 | A * | 3/2021 | ........ H04W 28/0268 |
| CN | 113747502 | A * | 12/2021 | ........... H04L 45/245 |

* cited by examiner

*Primary Examiner* — Mounir Moutaouakil
(74) *Attorney, Agent, or Firm* — Winston Hsu

(57) ABSTRACT

A management method employed by an access point (AP) multi-link device (MLD) includes: during association between the AP MLD and a non-AP MLD, obtaining capability indications signaled from the non-AP MLD, wherein the capability indications comprise at least a link addition capability indication of the non-AP MLD; and performing resource allocation for links between the AP MLD and the non-AP MLD according to at least a portion of the capability indications.

10 Claims, 3 Drawing Sheets

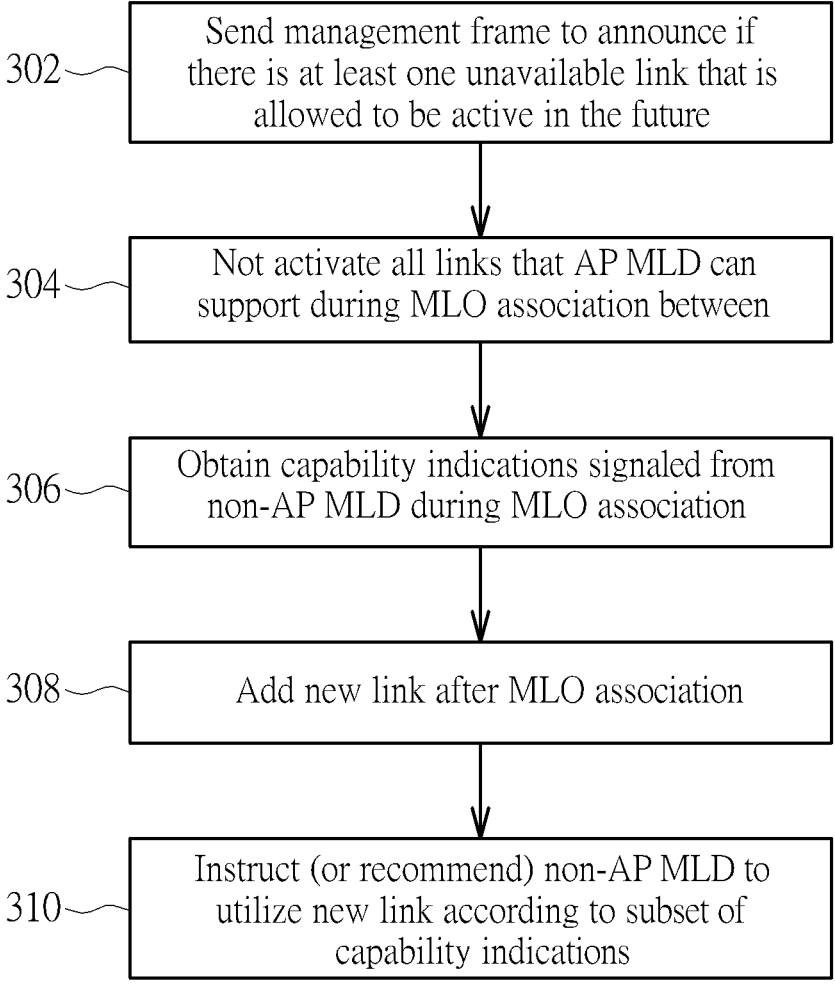

302 — Send management frame to announce if there is at least one unavailable link that is allowed to be active in the future 304 — Not activate all links that AP MLD can support during MLO association between 306 — Obtain capability indications signaled from non-AP MLD during MLO association 308 — Add new link after MLO association 310 — Instruct (or recommend) non-AP MLD to utilize new link according to subset of capability indications

FIG. 3

METHOD AND APPARATUS FOR DEALING WITH RESOURCE ALLOCATION AND/OR LINK ADDITION OF ACCESS POINT MULTI-LINK DEVICE

CROSS REFERENCE TO RELATED APPLICATIONS

This application claims the benefit of U.S. Provisional Application No. 63/176,386, filed on Apr. 19, 2021. The content of the application is incorporated herein by reference.

BACKGROUND

The present invention relates to wireless communications, and more particularly, to an apparatus and method for dealing with resource allocation and/or link addition of an access point (AP) multi-link device (MLD).

In a wireless fidelity (Wi-Fi) multi-link operation (MLO), there may exist several links between two multi-link devices (MLDs), including one access point (AP) MLD and one non-AP MLD. These links can operate independently to increase the overall throughput and/or to improve the connection stability. The AP MLD may be regarded as having multiple APs affiliated to the same MLD. The non-AP MLD may be regarded as having multiple non-AP stations (STAs) affiliated to the same MLD.

During MLO association between a non-AP MLD and an AP MLD, the non-AP MLD may determine how many links it uses for frame exchange with the AP MLD. It is possible that the non-AP MLD may not fully use all links it can support during the association. After the MLO association, the non-AP MLD may need to add a new link to increase the throughput or traffic stability, and/or may delete a current link due to power saving or resource management. However, for certain AP MLD architecture, certain resources dedicated to a non-AP MLD on each link are determined based on parameters signaled from the non-AP MLD during the association. They are difficult to be dynamically adjusted when link addition or link deletion happens after the association.

Furthermore, the number of links available to the non-AP MLD is up to the number of available links that the AP MLD provides. It is possible that the AP MLD may not activate all links it can support during the association, and may activate one or more unavailable links after the association.

Thus, there is a need for an innovative management scheme that enables an AP MLD to properly deal with resource allocation and/or link addition.

SUMMARY

One of the objectives of the claimed invention is to provide an apparatus and method for dealing with resource allocation and/or link addition of an access point (AP) multi-link device (MLD).

According to a first aspect of the present invention, an exemplary management method employed by an access point (AP) multi-link device (MLD) is disclosed. The exemplary management method includes: during association between the AP MLD and a non-AP MLD, obtaining capability indications signaled from the non-AP MLD, wherein the capability indications comprise at least a link addition capability indication of the non-AP MLD; and performing resource allocation for links between the AP MLD and the non-AP MLD according to at least a portion of the capability indications.

According to a second aspect of the present invention, an exemplary management method employed by an access point (AP) multi-link device (MLD) is disclosed. The exemplary management method includes: during association between the AP MLD and a non-AP MLD, obtaining capability indications signaled from the non-AP MLD, and activating only M links of the AP MLD, wherein the AP MLD is capable of providing services on N links, and N is larger than M; and in response to the AP MLD adding a new link to the M links, instructing or recommending the non-AP MLD to utilize the new link according to a subset of the capability indications.

According to a third aspect of the present invention, an exemplary management method employed by an access point (AP) multi-link device (MLD) is disclosed. The exemplary management method includes: sending a management frame to announce if there is at least one unavailable link that is allowed to be active in the future.

According to a fourth aspect of the present invention, an exemplary access point (AP) multi-link device (MLD) is disclosed. The exemplary AP MLD includes a network interface circuit and a control circuit. The network interface circuit is arranged to obtain capability indications signaled from the non-AP MLD during association between the AP MLD and a non-AP MLD, wherein the capability indications comprise at least a link addition capability indication of the non-AP MLD. The control circuit is arranged to perform resource allocation for links between the AP MLD and the non-AP MLD according to at least a portion of the capability indications.

According to a fifth aspect of the present invention, an exemplary access point (AP) multi-link device (MLD) is disclosed. The exemplary AP MLD includes a network interface circuit and a control circuit. The control circuit is arranged to control the network interface circuit to send a management frame for announcing if there is at least one unavailable link that is allowed to be active in the future.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a flowchart of a management method employed by an AP MLD for link addition according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
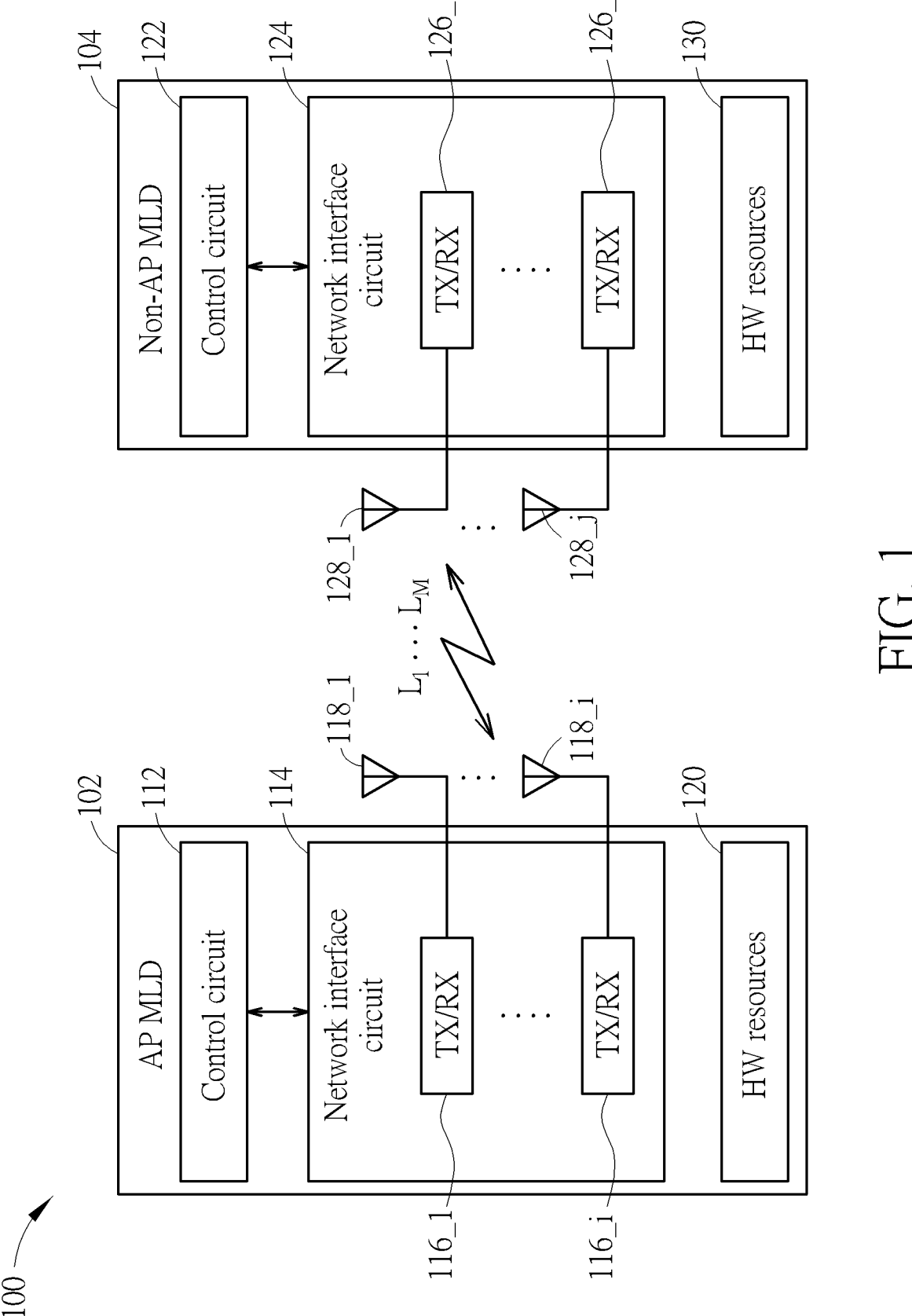
FIG. 1 is a diagram illustrating a wireless fidelity (Wi-Fi) system according to an embodiment of the present invention.

FIG. 1 is a diagram illustrating a wireless fidelity (Wi-Fi) system according to an embodiment of the present invention. The Wi-Fi system 100 has a plurality of wireless communication devices, including an access point (AP) multi-link device (MLD) 102 and a non-AP MLD 104, where the AP MLD 102 may be regarded as having multiple APs affiliated to the same MLD, and the non-AP MLD 104 may be regarded as having multiple non-AP stations (STAs) affiliated to the same MLD. For brevity and simplicity, only two wireless communication devices are shown in FIG. 1. In practice, the Wi-Fi system 100 is allowed to have more than two wireless communication devices, including an AP MLD and more than one non-AP MLD in the same basic service set (BSS). By way of example, but not limitation, the non-AP MLD 102 and the AP MLD 104 may be in compliance with IEEE 802.11ax standard or IEEE 802.11be standard.

In this embodiment, the AP MLD 102 may support i links $L_1$-$L_i$, and may communicate with the non-AP MLD 104 via M links $L_1$-$L_M$ that are set up during multi-link operation (MLO) association between AP MLD 102 and non-AP MLD 104, where M and i are positive integers, i is not smaller than 2 (i.e. i≥2), and M is not larger than i (i.e. M≤i).

Regarding the AP MLD 102, it may include a control circuit 112 and a network interface circuit 114, where the network interface circuit 114 may include a plurality of transceivers (labeled by "TX/RX") 116_1-116_i coupled to a plurality of antennas 118_1-118_i, respectively. Regarding the non-AP MLD 104, it may include a control circuit 122 and a network interface circuit 124, where the network interface circuit 124 may include a plurality of transceivers (labeled by "TX/RX") 126_1-126_j coupled to a plurality of antennas 128_1-128_j, respectively, where j is a positive integer, M is not larger than j (i.e. M j), and i is not smaller than j (i.e. i≥j).

Multiple links enabled between the AP MLD 102 and non-AP MLD 104 may share the same resources. For example, the APs or STAs in the same MLD may share some resources, such as memories, antennas, and/or radios. Hence, during the MLO association between AP MLD 102 and non-AP MLD 104, the AP MLD 102 has to adequately allocate its hardware (HW) resources 120 for links, and the non-AP MLD 104 also has to adequately allocate its hardware (HW) resources 130 for links.

The transceivers 116_1-116_i of the AP MLD 102 can communicate with some or all of the transceivers 126_1-126_j of the non-AP MLD 104 via links $L_1$-$L_M$ (M≥1) set up between non-AP MLD 102 and AP MLD 104. For example, the links $L_1$-$L_M$ may be channels at different radio-frequency (RF) bands, including 2.4 GHz band, 5 GHz band and/or 6 GHz band. The control circuit 112 at the AP MLD 102 and the control circuit 122 at the non-AP MLD 104 are arranged to control wireless communications between AP MLD 102 and non-AP MLD 104. For example, the control circuit 122 controls an STA-side transmit (TX) circuit to deal with uplink (UL) traffic between AP and non-AP STA, and controls an STA-side receive (RX) circuit to deal with downlink (DL) traffic between AP and non-AP STA, and the control circuit 112 controls an AP-side RX circuit to deal with UL traffic between AP and non-AP STA, and controls an AP-side TX circuit to deal with DL traffic between AP and non-AP STA. In this embodiment, the control circuit 112 is also involved in dealing with resource allocation and/or link addition of the AP MLD 102.

It should be noted that only the components pertinent to the present invention are illustrated in FIG. 1. In practice, the AP MLD 102 may include additional components to achieve designated functions, and the non-AP MLD 104 may include additional components to achieve designated functions.

Figure 2:
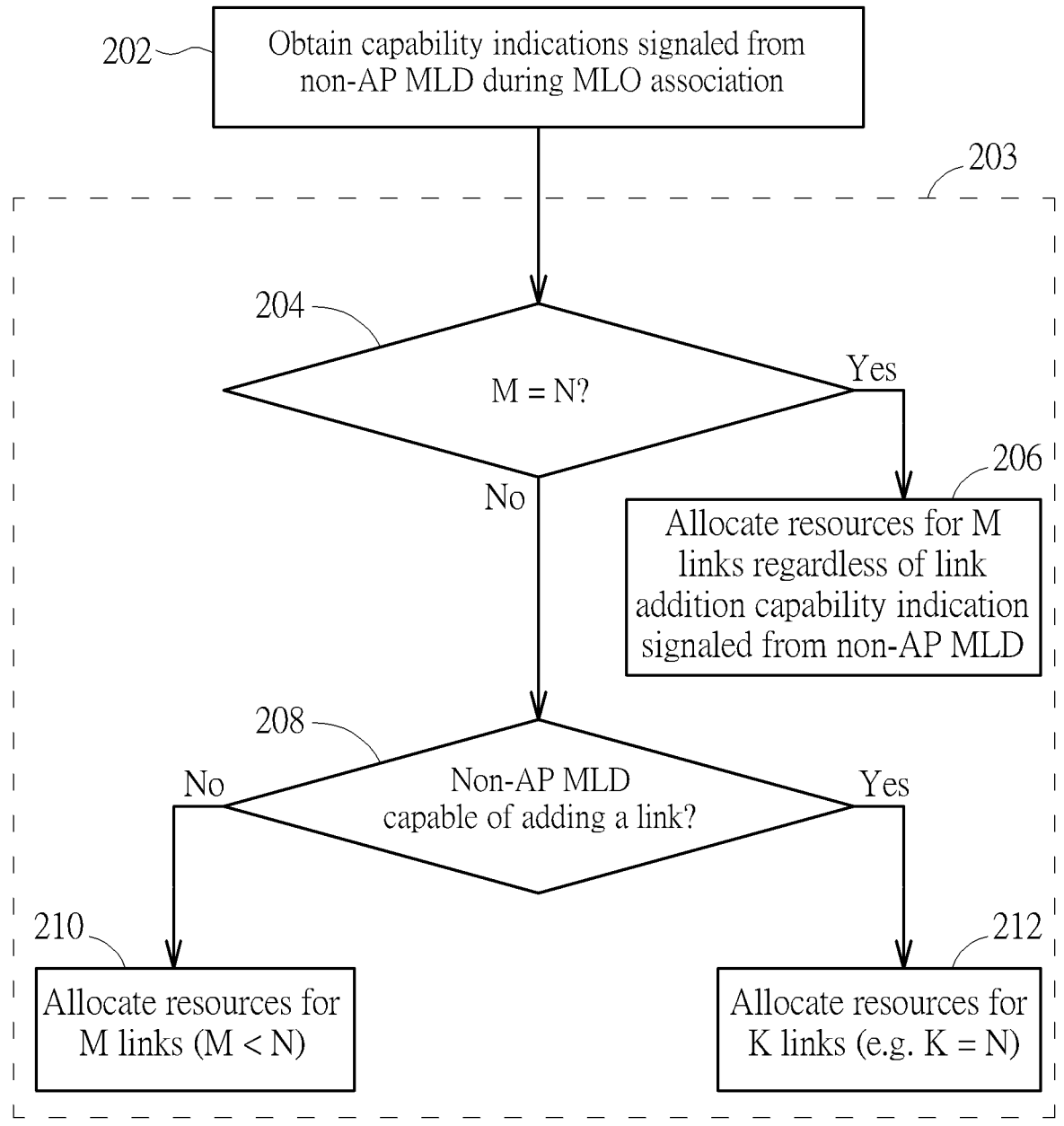
FIG. 2 is a flowchart of a management method employed by an access point (AP) multi-link device (MLD) for resource allocation according to an embodiment of the present invention.

Please refer to FIG. 2 in conjunction with FIG. 1. FIG. 2 is a flowchart of a management method employed by the AP MLD 102 for resource allocation according to an embodiment of the present invention. Provided that the result is substantially the same, the steps are not required to be executed in the exact order shown in FIG. 2. At step 202, the network interface circuit 114 obtains capability indications signaled from the non-AP MLD 104 during MLO association between AP MLD 102 and non-AP MLD 104, and provides the capability indications of non-AP MLD 104 to the control circuit 112. For example, a subset of the signaled capability indications may include a link addition capability indication of the non-AP MLD 104 and the maximum number of links the non-AP MLD 104 can support. After the capability indications of the non-AP MLD 104 are available to the control circuit 112, a resource allocation process can be initiated (Step 203).

In this embodiment, the control circuit 112 performs resource allocation upon the hardware resources 120 according to at least a portion (i.e. part or all) of the capability indications signaled from the non-AP MLD 104. The resource allocation process (Step 203) performed by the control circuit 112 may include steps 204, 206, 208, 210, and 212. Suppose that the AP MLD 102 is capable of providing services on N links (e.g. $L_1$-$L_N$, where N=i), and M links (e.g. $L_1$-$L_M$) are set up by the non-AP MLD 104 during the MLO association between AP MLD 102 and non-AP MLD 104. At step 204, the control circuit 112 checks if M is equal to N. If M is equal to N, the flow proceeds with step 206. At step 206, the control circuit 112 performs resource allocation upon the hardware resources 120 for allocating resources for the M links regardless of the link addition capability indication signaled from non-AP MLD 104. That is, regarding the resource allocation for the M links (M=N), the link addition capability of the non-AP MLD 104 does not matter in this resource allocation case due to the fact that the non-AP MLD 104 already enables all links supported by AP MLD 102 during the MLO association and the AP MLD 102 can reject a link addition request from the non-AP MLD 104 after the MLO association.

If M is not equal to N (particularly, M is smaller than N), the flow proceeds with step 208. At step 208, the control circuit 112 checks the link addition capability indication signaled from non-AP MLD 104 to determine if the non-AP MLD 104 is capable of adding a link. If the link addition capability indication indicates that the non-AP MLD 104 is incapable of adding a link, the flow proceeds with step 210. At step 210, the control circuit 112 performs resource allocation upon the hardware resources 120 for allocating resources for the M links (M<N). Suppose that the maximum number of links the non-AP MLD 104 can support is larger than M. Since the non-AP MLD 104 that only enables M links for frame exchange is unable to add any new link after the MLO association, the control circuit 112 just needs to allocate resources for only M links. In other words, the maximum number of links the non-AP MLD 104 can support does not matter in this resource allocation case.

If the link addition capability indication indicates that the non-AP MLD 104 is capable of adding a link, the flow proceeds with step 212. At step 212, the control circuit 112 performs resource allocation upon the hardware resources 120 for allocating resources for K links, where K is a positive integer larger than M and not larger than N (i.e. M<K≤N). Suppose that the maximum number of links the non-AP MLD 104 can support is equal to K. Since the non-AP MLD 104 that enables only M links (M<K) during the MLO association is able to add one or more new links after the MLO association, the control circuit 112 needs to allocate resources for the K links that may be all enabled by the non-AP MLD 104 in the future. It is possible that (K-M) resources allocated by the control circuit 112 may not be used during the non-AP MLD's life time. It should be noted that, when the maximum number of links the non-AP MLD 104 can support is equal to the number of links on which the AP MLD 102 can provide services (i.e. K=N), the control circuit 112 allocates resources for all N links available on AP MLD 102.

Please refer to FIG. 3 in conjunction with FIG. 1. FIG. 3 is a flowchart of a management method employed by the AP MLD 102 for link addition according to an embodiment of the present invention. Provided that the result is substantially the same, the steps are not required to be executed in the exact order shown in FIG. 3. At step 302, the control circuit 112 controls the network interface circuit 114 to send a management frame for announcing if there is at least one unavailable link that is allowed to be active in the future. For example, the management frame may be a beacon frame, an association response frame, etc.

At step 304, the AP MLD 102 does not activate all links it can support during the MLO association between AP MLD 102 and non-AP MLD 104. For example, assuming that the AP MLD 102 is capable of providing services on N links (e.g. $L_1$-$L_N$, where N=i), only M links (e.g. $L_1$-$L_M$, where M<N) may be available on the AP MLD 102 during the MLO association between AP MLD 102 and non-AP MLD 104. Since the AP MLD 102 does not activate all links it can support, the aforementioned management frame (e.g. beacon frame or association response frame) may carry information about the number of unavailable links, and may further carry information about characteristics of each unavailable link, such as bandwidth, channelization and/or number of spatial streams (NSS). Furthermore, since there are unavailable link(s) on the AP MLD 102 that the non-AP MLD 104 may utilize in the future, the non-AP MLD 104 needs to perform resource allocation upon the hardware resources 130 to allocate resources for these unavailable link (s) during the MLO association between AP MLD 102 and non-AP MLD 104.

At step 306, the network interface circuit 114 obtains capability indications signaled from the non-AP MLD 104 during MLO association between AP MLD 102 and non-AP MLD 104, and provides the capability indications of non-AP MLD 104 to the control circuit 112. For example, a subset of the signaled capability indications may include a link addition capability indication of the non-AP MLD 104, a link switch capability indication of the non-AP MLD 104, and the maximum number of links the non-AP MLD 104 can support. The link addition capability indication may indicate if the non-AP MLD 104 is capable of adding a link. The link switch capability indication may indicate if the non-AP MLD 104 is capable of switching a certain link to another link.

The AP MLD 102 may add extra link(s) for associated non-AP MLD 104 due to load balancing or other BSS management purposes. That is, one or more unavailable links on the AP MLD 102 may be activated and then become available to the non-AP MLD 104. At step 308, the AP MLD 102 adds a new link (which is originally declared as an unavailable link, and now becomes an available link) to the M links (which are available links) after the MLO association between AP MLD 102 and non-AP MLD 104.

At step 310, the control circuit 112 instructs/recommends the non-AP MLD 104 to utilize the new link according to a subset of the capability indications obtained at step 306. Specifically, the control circuit 112 instructs/recommends the non-AP MLD 104 to utilize the new link via the network interface circuit 114. In one exemplary design, when the link addition capability indication indicates that the non-AP MLD 104 is capable of adding a link and the non-AP MLD 104 does not use the maximum number of links that the non-AP MLD 104 supports, the control circuit 112 instructs/recommends the non-AP MLD 104 to add a link connection to the new link.

In another exemplary design, when the link switch capability indication indicating that the non-AP MLD is capable of switching a first link to a second link, the control circuit 112 instructs/recommends the non-AP MLD 104 to switch a current link to the new link, where the current link is the first link indicated by the link switch capability indication, and the new link is the second link indicated by the link switch capability indication. In other words, the new link added by the AP MLD 102 is in the subset of links to which the current link is capable of being switched.

For example, the AP MLD 102 has two active links on 2.4 GHz and 5 GHz, and the non-AP MLD 104 operates on the 2.4 GHz link and the 5 GHz link. When the AP MLD 102 adds a new active link on 6 GHz, the AP MLD 102 may instruct/recommend one of the 2.4 GHz link and the 5 GHz link to switch to the 6 GHz, if both 2.4 GHz link and 5 GHz link are capable of being switched to another link (i.e. 6 Ghz link); and may instruct/recommend the 5 GHz link to switch to the 6 GHz, if only the 5 GHz link is capable of being switched to another link (i.e. 6 Ghz link).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A management method employed by an access point (AP) multi-link device (MLD), comprising:
   during association between the AP MLD and a non-AP MLD, obtaining capability indications signaled from the non-AP MLD, wherein the capability indications comprise at least a link addition capability indication of the non-AP MLD, wherein the link addition capability indication indicates that the non-AP MLD is capable of adding at least one new link between the AP MLD and the non-AP MLD after the association, and the at least one new link is not set up during the association; and
   performing resource allocation for links between the AP MLD and the non-AP MLD according to at least a portion of the capability indications.

2. The management method of claim 1, wherein the AP MLD is capable of providing services on N links, M links are set up by the non-AP MLD during the association between the AP MLD and the non-AP MLD, and performing the resource allocation for links between the AP MLD and the non-AP MLD according to said at least a portion of the capability indications comprises:

in response to M being smaller than N and the link addition capability indication indicating that the non-AP MLD is incapable of adding a link, allocating resources for only the M links.

3. The management method of claim 1, wherein the AP MLD is capable of providing services on N links, M links are set up by the non-AP MLD during the association between the AP MLD and the non-AP MLD, and performing the resource allocation for links between the AP MLD and the non-AP MLD according to said at least a portion of the capability indications comprises:

in response to M being equal to N, allocating resources for the M links regardless of the link addition capability indication.

4. The management method of claim 1, wherein the AP MLD is capable of providing services on N links, M links are set up by the non-AP MLD during the association between the AP MLD and the non-AP MLD, and performing the resource allocation for links between the AP MLD and the non-AP MLD according to said at least a portion of the capability indications comprises:

in response to M being smaller than N and the link addition capability indication indicating that the non-AP MLD is capable of adding a link, allocating resources for K links, where K is larger than M, and is not larger than N.

5. The management method of claim 4, wherein K is equal to N.

6. The management method of claim 4, wherein the capability indications further comprise a maximum number of links that the non-AP MLD supports, and K is equal to the maximum number of links that the non-AP MLD supports.

7. A management method employed by an access point (AP) multi-link device (MLD), comprising:

during association between the AP MLD and a non-AP MLD, obtaining capability indications signaled from the non-AP MLD, and activating only M links of the AP MLD, wherein the AP MLD is capable of providing services on N links, and N is larger than M; and in response to the AP MLD adding a new link to the M links after the association, instructing or recommending the non-AP MLD to utilize the new link according to a subset of the capability indications, wherein the new link is not activated during the association.

8. The management method of claim 7, wherein the subset of the capability indications comprises a link addition capability indication of the non-AP MLD and a maximum number of links that the non-AP MLD supports, and instructing or recommending the non-AP MLD to utilize the new link according to the subset of the capability indications comprises:

in response to the link addition capability indication indicating that the non-AP MLD is capable of adding a link and the non-AP MLD not using maximum number of links that the non-AP MLD supports, instructing or recommending the non-AP MLD to add a link connection to the new link.

9. The management method of claim 7, wherein the subset of the capability indications comprises a link switch capability indication of the non-AP MLD, and instructing or recommending the non-AP MLD to utilize the new link according to the subset of the capability indications comprises:

in response to the link switch capability indication indicating that the non-AP MLD is capable of switching a first link to a second link, instructing or recommending the non-AP MLD to switch a current link to the new link, where the current link is the first link indicated by the link switch capability indication, and the new link is the second link indicated by the link switch capability indication.

10. An access point (AP) multi-link device (MLD) comprising:

a network interface circuit, arranged to obtain capability indications signaled from the non-AP MLD during association between the AP MLD and a non-AP MLD, wherein the capability indications comprise at least a link addition capability indication of the non-AP MLD, wherein the link addition capability indication indicates that the non-AP MLD is capable of adding at least one new link between the AP MLD and the non-AP MLD after the association, and the at least one new link is not set up during the association; and a control circuit, arranged to perform resource allocation for links between the AP MLD and the non-AP MLD according to at least a portion of the capability indications.

* * * * *